(12) United States Patent
Hariharan

(10) Patent No.: US 11,920,840 B2
(45) Date of Patent: Mar. 5, 2024

(54) UNIT COOLER WITH STAGGERED DEFROST ON A PLURALITY OF EVAPORATOR COILS

(71) Applicant: Heatcraft Refrigeration Products LLC, Stone Mountain, GA (US)

(72) Inventor: Nataraj Hariharan, Alpharetta, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 238 days.

(21) Appl. No.: 17/085,003

(22) Filed: Oct. 30, 2020

(65) Prior Publication Data

US 2022/0136749 A1   May 5, 2022

(51) Int. Cl.

| | |
|---|---|
| *F25B 49/02* | (2006.01) |
| *F25B 39/00* | (2006.01) |
| *F25B 41/20* | (2021.01) |
| *F25B 41/31* | (2021.01) |
| *F25B 47/02* | (2006.01) |

(52) U.S. Cl.
CPC .............. *F25B 47/02* (2013.01); *F25B 39/00* (2013.01); *F25B 41/20* (2021.01); *F25B 41/31* (2021.01); *F25B 49/02* (2013.01); *F25B 2347/02* (2013.01); *F25B 2600/2515* (2013.01); *F25B 2700/197* (2013.01); *F25B 2700/21175* (2013.01)

(58) Field of Classification Search
CPC ...... F25B 2700/21175; F25B 2700/197; F25B 2600/2515; F25B 2347/02; F25B 49/02; F25B 41/20; F25B 41/31; F25B 47/02
See application file for complete search history.

(56) References Cited

U.S. PATENT DOCUMENTS

| | | |
|---|---|---|
| 5,924,297 A | 7/1999 | Wolff et al. |
| 7,171,817 B2 | 2/2007 | Birgen |
| 9,285,153 B2 | 3/2016 | Contreras Lafaire et al. |

(Continued)

FOREIGN PATENT DOCUMENTS

KR     20070065824 A    *   6/2007    .............. F25B 49/02

OTHER PUBLICATIONS

Tan, Multi-Range Indoor Air Conditioning Heating System, 2007, Full Document (Year: 2007).*

(Continued)

*Primary Examiner* — Nael N Babaa
(74) *Attorney, Agent, or Firm* — Baker Botts L.L.P.

(57) ABSTRACT

An HVAC system includes a unit cooler, which includes a first evaporator coil, a second evaporator coil, and a blower. The HVAC system further includes a first sensor, a second sensor, a first valve, a second valve, and a controller. The controller actuates the blower to direct air to flow over the first evaporator coil and the second evaporator coil, receives measurements from the first sensor and the second sensor, initiates a defrost cycle for the first evaporator coil by transmitting instructions to close the first valve to prevent the flow of refrigerant into the first evaporator coil, transmits instructions to open the first valve when the defrost cycle for the first evaporator coil has terminated, and initiates a defrost cycle for the second evaporator coil by transmitting instructions to close the second valve to prevent the flow of refrigerant into the second evaporator coil.

7 Claims, 3 Drawing Sheets

(56) References Cited

U.S. PATENT DOCUMENTS

| | | |
|---|---|---|
| 9,772,124 B2 | 9/2017 | Wintemute et al. |
| 2002/0184900 A1 | 12/2002 | Wellman |
| 2005/0028544 A1* | 2/2005 | Dube ........................ F25B 5/02 |
| | | 62/272 |
| 2014/0319232 A1* | 10/2014 | Gourlay ................. F24F 11/523 |
| | | 236/1 C |
| 2017/0370627 A1 | 12/2017 | Takenaka et al. |

OTHER PUBLICATIONS

European Patent Office, Extended European Search Report, Application No. 21203519.0, dated Mar. 17, 2022, 8 pages.

* cited by examiner

UNIT COOLER WITH STAGGERED DEFROST ON A PLURALITY OF EVAPORATOR COILS

TECHNICAL FIELD

The present disclosure relates generally to heating, ventilation, and air conditioning (HVAC) systems and methods of their use. In particular, the present disclosure relates to a system and method for staggering a defrost operation across a plurality of evaporator coils.

BACKGROUND

Heating, ventilation, and air conditioning (HVAC) systems are used to regulate environmental conditions within an enclosed space. Air is cooled or heated via heat transfer with refrigerant flowing through the system and returned to the enclosed space as conditioned air.

SUMMARY OF THE DISCLOSURE

In an embodiment, a heating, ventilation and air conditioning (HVAC) system includes a refrigerant conduit subsystem and a condensing unit. The condensing unit includes a compressor, a condenser, and a fan. The HVAC system includes a unit cooler, wherein the unit cooler includes a first evaporator coil, a second evaporator coil, and a blower. The HVAC system further includes a first sensor disposed at a discharge side of the first evaporator coil, a second sensor disposed at a discharge side of the second evaporator coil, a first valve disposed upstream of the unit cooler, a second valve disposed upstream of the unit cooler, and a controller. The controller actuates the blower to direct air to flow over the first evaporator coil and the second evaporator coil, receives measurements from the first sensor and the second sensor, initiates a defrost cycle for the first evaporator coil by transmitting instructions to close the first valve to prevent the flow of refrigerant into the first evaporator coil, transmits instructions to open the first valve when the defrost cycle for the first evaporator coil has terminated, and initiates a defrost cycle for the second evaporator coil by transmitting instructions to close the second valve to prevent the flow of refrigerant into the second evaporator coil.

In another embodiment, a method includes actuating a blower of a heating, ventilation, and air conditioning (HVAC) system to direct air to flow through a unit cooler comprising a first evaporator coil and a second evaporator coil, wherein the air flows over the first evaporator coil and the second evaporator coil. The method includes transmitting measurements from a first sensor and a second sensor to a controller. The method includes initiating, by the controller, a defrost cycle for the first evaporator coil by transmitting instructions to close a first valve, wherein the first valve is disposed upstream of the unit cooler and fluidly coupled to the first evaporator coil. The method includes transmitting instructions to open the first valve when the defrost cycle for the first evaporator coil has terminated. The method includes initiating, by the controller, a defrost cycle for the second evaporator coil by transmitting instructions to close a second valve, wherein the second valve is disposed upstream of the unit cooler and fluidly coupled to the second evaporator coil.

In yet another embodiment, a HVAC system includes a unit cooler, wherein the unit cooler includes a first evaporator coil, a second evaporator coil, and a blower. The HVAC system further includes a first sensor disposed at a discharge side of the first evaporator coil, a second sensor disposed at a discharge side of the second evaporator coil, a first valve disposed upstream of the unit cooler, a second valve disposed upstream of the unit cooler, and a controller. The controller actuates the blower to direct air to flow over the first evaporator coil and the second evaporator coil, receives measurements from the first sensor and the second sensor, initiates a defrost cycle for the first evaporator coil by transmitting instructions to close the first valve to prevent the flow of refrigerant into the first evaporator coil, transmits instructions to open the first valve when the defrost cycle for the first evaporator coil has terminated, and initiates a defrost cycle for the second evaporator coil by transmitting instructions to close the second valve to prevent the flow of refrigerant into the second evaporator coil.

Technical advantages of this disclosure may include one or more of the following. Embodiments of this disclosure may mitigate the increase in indoor temperature as an HVAC system operates in a defrost cycle. For example, during the defrost cycle, a valve upstream of a unit cooler closes to prevent the flow of refrigerant into at least two evaporator coils disposed within the unit cooler. A blower will direct air to flow over the at least two evaporator coils to thaw or melt any built-up ice and frost. Because refrigerant is not flowing through the at least two evaporator coils to remove the heat transferred from the air, the indoor temperature will rise. By coupling each of the at least two evaporator coils to separate valves upstream, the HVAC system can stagger operating each of the at least two evaporator coils in a defrost cycle and the remaining evaporator coils in a cooling cycle to maintain the indoor temperature at or near a temperature setpoint.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Cooling systems cycle refrigerant to cool various spaces. For example, an HVAC system cycles refrigerant to cool spaces near or around air conditioner loads. These loads include metal components, such as coils, that carry the refrigerant. As the refrigerant passes through these metallic components, frost and/or ice may accumulate on the exterior of these metallic components. The ice and/or frost reduce the efficiency of the load. For example, as frost and/or ice accumulates on a load, it may become more difficult for the refrigerant within the load to absorb heat that is external to the load.

One way to address frost and/or ice accumulation on the load is to perform a defrost cycle. The defrost cycle may include a period of time in which the HVAC system is shut off and the ice and/or frost is allowed to naturally thaw. The defrost cycle may further include running certain components of the HVAC system, such as the fan, to blow air that is at a temperature greater than the ice and/or frost to increase the speed at which the ice and/or frost would naturally thaw and melt. As such, it may take time to perform a defrost cycle to remove any ice and/or frost.

This disclosure contemplates an unconventional cooling system that staggers a defrost cycle for at least two evaporator coils. While one of the at least two evaporator coils undergoes a defrost cycle, the remaining at least two evaporator coils operate under a cooling cycle, thereby maintaining the indoor temperature at or around the temperature setpoint. The cooling system will be described using FIGS. 1 through 5, wherein FIG. 1 will describe the overall, improved cooling system, and FIGS. 2-5 will describe the configuration and operation of the unit cooler within the cooling system in further detail.

HVAC System

Figure 1:
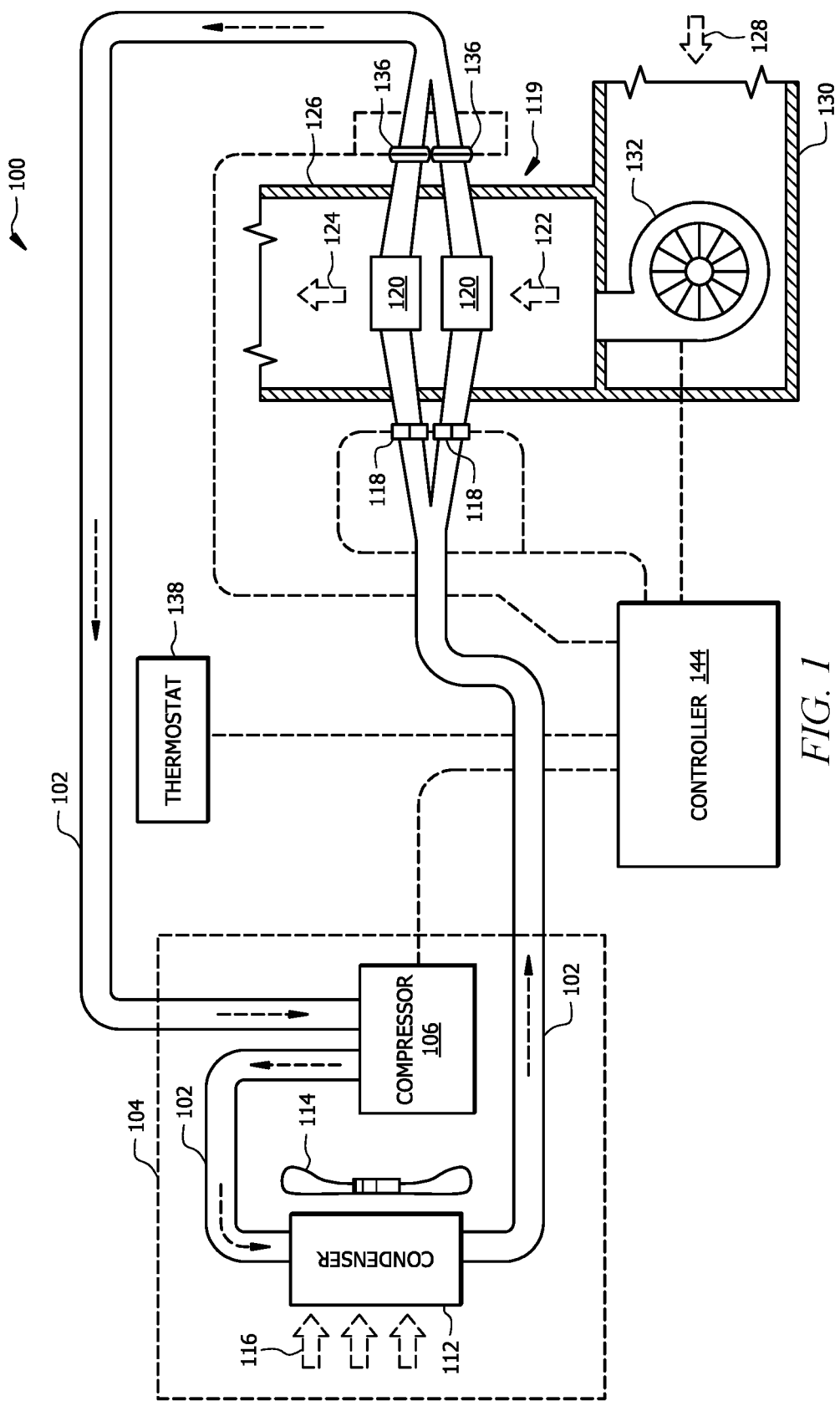
FIG. 1 illustrates one embodiment of a HVAC system, according to the present disclosure.

FIG. 1 is a diagram of an embodiment of an HVAC system 100 configured to pump refrigerant to condition air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system may be located within the building and portion(s) outside the building. The HVAC system 100 may be configured as shown in FIG. 1 or in any other suitable configuration. For example, the HVAC system 100 may include additional components or may omit one or more components shown in FIG. 1. For instance, in some embodiments, the HVAC system 100 may be configured to act as a heat pump by reversing flow of the refrigerant through the system.

The HVAC system 100 includes a refrigerant conduit subsystem 102, a condensing unit 104, a plurality of valves 118, a unit cooler 119, a thermostat 138, and a controller 144. The refrigerant conduit subsystem 102 facilitates the movement of a refrigerant (e.g., a refrigerant) through a cooling cycle such that the refrigerant flows as illustrated by the dashed arrows in FIG. 1. The refrigerant may be any acceptable refrigerant including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The condensing unit 104 includes a compressor 106, a condenser 112, and a fan 114. In some embodiments, the condensing unit 104 is an outdoor unit while other components of system 100 may be indoors. The compressor 106 is coupled to the refrigerant conduit subsystem 102 and compresses (i.e., increases the pressure of) the refrigerant. The compressor 106 of condensing unit 104 may be a variable speed or multi-stage compressor. A variable speed compressor is generally configured to operate at different speeds to increase the pressure of the refrigerant to keep the refrigerant moving along the refrigerant conduit subsystem 102. In the variable speed compressor configuration, the speed of compressor 106 can be modified to adjust the cooling capacity of the HVAC system 100. Meanwhile, a multi-stage compressor may include multiple compressors, each configured to operate at a constant speed to increase the pressure of the refrigerant to keep the refrigerant moving along the refrigerant conduit subsystem 102. In the multi-stage compressor configuration, one or more compressors can be turned on or off to adjust the cooling capacity of the HVAC system 100.

The compressor 106 may be in signal communication with the controller 144 using a wired or wireless connection. The controller 144 provides commands or signals to control the operation of the compressor 106 and/or receives signals from the compressor 106 corresponding to a status of the compressor 106. For example, when the compressor 106 is a variable speed compressor, the controller 144 may provide a signal to control the compressor speed. When the compressor 106 operates as a multi-stage compressor, the controller 144 may provide an indication of the number of compressors to turn on and off to adjust the compressor 106 for a given cooling capacity. The controller 144 may operate the compressor 106 in different modes corresponding to load conditions (e.g., the amount of cooling or heating required by the HVAC system 100). The controller 144 is described in greater detail below with respect to FIG. 5.

The condenser 112 is configured to facilitate movement of the refrigerant through the refrigerant conduit subsystem 102. The condenser 112 is generally located downstream of the compressor 106 and is configured to remove heat from the refrigerant. The fan 114 is configured to move air 116 across the condenser 112. For example, the fan 114 may be configured to blow outside air through the condenser 112 to assist in cooling the refrigerant flowing therethrough. The fan 114 may be in signal communication with the controller 144 via wired and/or wireless communication. For instance, the fan 114 may receive signals from the controller 144 causing the fan to turn on or off based on a cooling need. The compressed, cooled refrigerant flows from the condenser 112 toward an expansion device 118.

Each of the plurality of valves 118 is coupled to the refrigerant conduit subsystem 102 downstream of the condenser 112 and is configured to remove pressure from the refrigerant. In this way, the refrigerant is delivered to the unit cooler 119 and receives heat from airflow 122 to produce a conditioned airflow 124 that is delivered by a duct subsystem 126 to the conditioned space, wherein the duct subsystem 126 is coupled to the unit cooler 119. In general, each of the plurality of valves 118 may be a solenoid valve, a thermostatic expansion valve (TXV) valve, an electronic expansion valve (EEV), or any other suitable valve for removing pressure from the refrigerant while, optionally, providing control of the rate of flow of the refrigerant. The plurality of valves 118 may be in communication with the controller 144 (e.g., via wired and/or wireless communication) to receive control signals for opening and/or closing associated valves and/or to provide flow measurement signals corresponding to the rate at which refrigerant flows through the refrigerant conduit subsystem 102.

The unit cooler 119 may be configured to force airflow over a plurality of evaporator coils with at least one fan. As illustrated, the unit cooler 119 may comprise at least two evaporator coils 120. The at least two evaporator coils 120 are generally any heat exchanger configured to provide heat transfer between air flowing through the unit cooler 119 (i.e., contacting an outer surface of the at least two evaporator coils 120) and refrigerant passing through the interior of the at least two evaporator coils 120. In embodiments, there may be an equivalent number of the plurality of valves 118 in relation to the at least two evaporator coils 120, wherein each of the plurality of valves 118 may be disposed upstream of each of the at least two evaporator coils 120. The unit cooler 119 is fluidically connected to the compressor 106, such that refrigerant generally flows from the at least two evaporator coils 120 of the unit cooler 119 to the compressor 106. A portion of the HVAC system 100 is configured to move air 122 across the at least two evaporator coils 120 and out of the duct sub-system 126 as conditioned air 124. Return air 128, which may be air returning from the building, fresh air from outside, or some combination, is pulled into a return duct 130 coupled to or incorporated into the unit cooler 119.

The blower 132 pulls the return air 128 and discharges airflow 122 into or through the unit cooler 119, wherein the airflow 122 crosses the at least two evaporator coils 120 to produce the conditioned airflow 124. The blower 132 is any mechanism for providing a flow of air through the HVAC system 100. For example, the blower 132 may be a constant-speed or variable-speed circulation blower or fan. Examples of a variable-speed blower include, but are not limited to, belt-drive blowers controlled by inverters, direct-drive blowers with electronic commuted motors (ECM), or any other suitable types of blowers. The blower 132 may be in signal communication with the controller 144 using any suitable type of wired or wireless connection. The controller 144 is configured to provide commands or signals to the blower 132 to control its operation. For example, the controller 144 may be configured to transmit signals to the blower 132 to control the speed of the blower 132.

The HVAC system 100 includes a plurality of sensors 136 in signal communication with the controller 144. The plurality of sensors 136 may include any suitable type of sensor for measuring air temperature, temperature and/or pressure of the refrigerant, other properties of the conditioned space (e.g. a room or building) other properties of the surrounding environment (e.g., outdoors), and any combinations thereof. The plurality of sensors 136 may be positioned anywhere within the conditioned space, the HVAC system 100, and/or the surrounding environment. As an example, the HVAC system 100 may include one of the plurality of sensors 136 positioned and configured to measure the temperature of the refrigerant discharged from one of the at least two evaporator coils 120. In certain embodiments, the HVAC system 100 may include an equivalent amount of sensors 136 in relation to the at least two evaporator coils 120, wherein there may be one of the plurality of sensors 136 disposed at a discharge side or downstream from each of the at least two evaporator coils 120. In other cases, the HVAC system 100 may include sensors positioned and configured to measure any other suitable type of air temperature and/or other property (e.g., the temperature of air at one or more locations within the conditioned space, e.g., an indoor and/or outdoor humidity).

The HVAC system 100 includes thermostat 138, which may be located within the conditioned space (e.g. a room or building). The thermostat 138 is generally in signal communication with the controller 144 using any suitable type of wired or wireless communication. The thermostat 138 may be a single-stage thermostat, a multi-stage thermostat, or any suitable type of thermostat for the HVAC system 100. The thermostat 138 is configured to allow a user to input a desired temperature or temperature setpoint for a designated space or zone such as a room in the conditioned space. The controller 144 may use information from the thermostat 138 such as the temperature setpoint for controlling the compressor 106, the fan 114, the plurality of valves 118, and/or the blower 132. In some embodiments, the thermostat 138 includes a user interface for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for input of the temperature setpoint.

As described above, in certain embodiments, connections between various components of the HVAC system 100 may be wired. For example, conventional cable and contacts may be used to couple the controller 144 to the various components of the HVAC system 100, including, the compressor 106, the plurality of valves 118, the blower 132, the plurality of sensors 136, and thermostat 138. In some embodiments, a wireless connection may be employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example, and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 144 to other components of the HVAC system 100.

In an example operation of HVAC system 100, the HVAC system 100 starts up to provide cooling to an enclosed space based on a temperature setpoint. For example, in response to the indoor temperature exceeding the temperature setpoint, the controller 144 may cause the compressor 106, the fan 114, and the blower 132 to turn on to "startup" the HVAC system 100. As the HVAC system 100 operates, ice and/or frost may accumulate around the at least two evaporator coils 120, wherein a defrost cycle may be required to reduce, thaw, and/or melt the ice and/or frost. During a defrost cycle, the plurality of valves 118 may be actuated to close, and the blower 132 may be actuated to direct the airflow 122 over the at least two evaporator coils 120. Because the plurality of valves 118 may be closed, the indoor temperature may increase as there is no heat transfer to the refrigerant where the refrigerant is then directed elsewhere for the removal of heat to an external environment. The present disclosure provides for keeping the indoor temperature at or close to the temperature setpoint by staggering the defrost cycle throughout the at least two evaporator coils 120 while operating the HVAC system 100. In certain embodiments, a first one of the at least two evaporator coils 120 may undergo the defrost cycle while the remaining of the at least two evaporator coils 120 may operate under the cooling cycle. When the defrost cycle is done for that first one of the at least two evaporator coils 120, a subsequent one of the remaining at least two evaporator coils 120 may undergo a defrost cycle, and the HVAC system 100 may be actuated to operate the first one of the at least two evaporator coils 120 under the cooling cycle. Embodiments of the system are described below using FIGS. 2-4.

Unit Cooler

Figure 2:
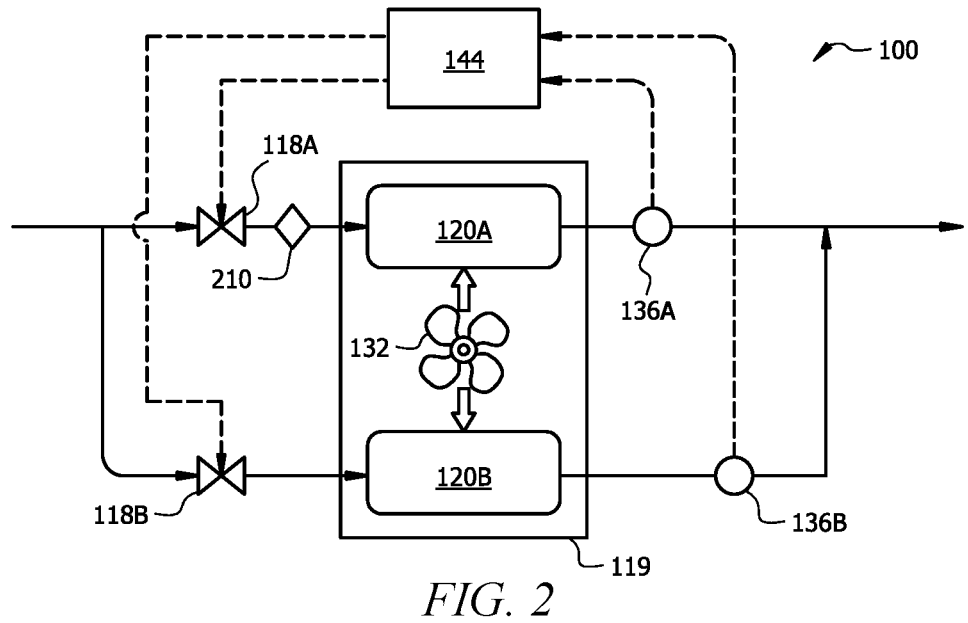
FIG. 2 illustrates one embodiment of a unit cooler used in the HVAC system illustrated in FIG. 1.
Figure 3:
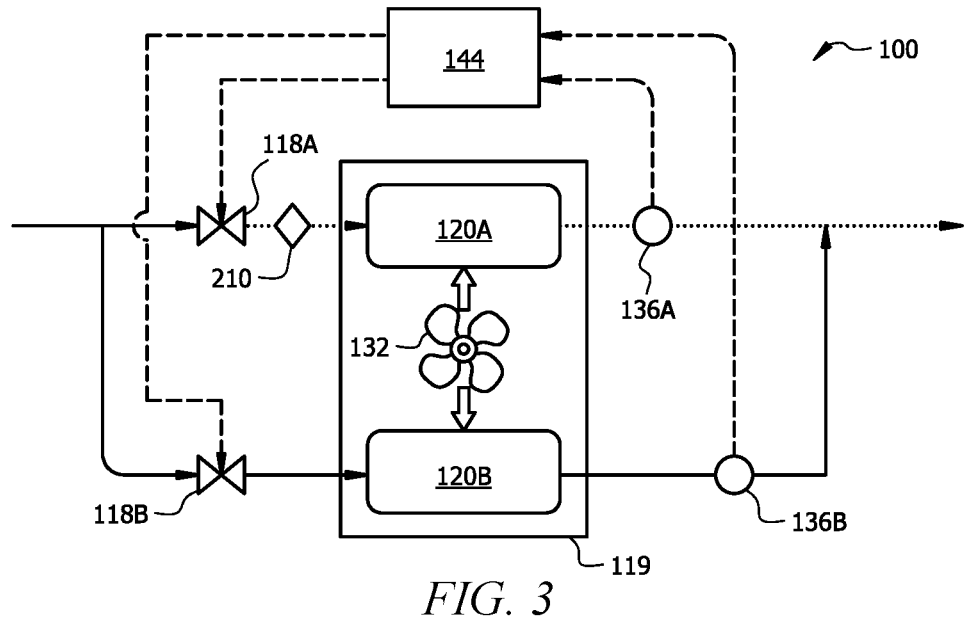
FIG. 3 illustrates one embodiment of a unit cooler used in the HVAC system illustrated in FIG. 1.

FIGS. 2-3 illustrate an example unit cooler 119 incorporated into the HVAC system 100. FIG. 2 illustrates the unit cooler 119 operating a cooling cycle, and FIG. 3 illustrates the unit cooler 119 operating under a defrost cycle and a cooling cycle. As seen in FIGS. 2-3, unit cooler 119 includes a first evaporator coil 120A, a second evaporator coil 120B, and the blower 132. As illustrated, the HVAC system 100 may comprise a first valve 118A, a second valve 118B, a first sensor 136A, and a second sensor 136B. In embodiments, the controller 144 may be configured to monitor the HVAC system 100 during a cooling cycle and a defrost cycle, wherein the controller 144 may be communicatively coupled to the first valve 118A, the second valve 118B, the first sensor 136A, and the second sensor 136B.

As previously described, unit cooler 119 may be configured to contain at least two evaporator coils and to facilitate heat transfer between the at least two evaporator coils and the surrounding air to decrease the temperature of the air. Both the first evaporator coil 120A and the second evaporator coil 120B may be configured to transfer heat between air flowing through the unit cooler 119 and refrigerant passing through the interior of both the first evaporator coil 120A and the second evaporator coil 120B. In certain embodiments, both the first evaporator coil 120A and the second evaporator coil 120B may be disposed within the unit cooler 119. Both the first sensor 136A and the second sensor 136B may be configured to measure the temperature and/or pressure of the refrigerant discharged from the first evaporator coil 120A and the second evaporator coil 120B. In embodiments, both the first sensor 136A and the second sensor 136B may be disposed downstream of the unit cooler 119, wherein the first sensor 136A may be communicatively coupled to the first evaporator coil 120A, and the second sensor 136B may be communicatively coupled to the second evaporator coil 120B. The controller 144 may be configured to receive information from the thermostat 138 (referring to FIG. 1), such as the temperature setpoint, and from the first sensor 136A and second sensor 136B, such as the temperature and/or pressure measurements, and to control the first valve 118A and the second valve 118B.

In the illustrated embodiment, both the first valve 118A and the second valve 118B may be disposed upstream of the unit cooler 119. However, the first valve 118A may be fluidly coupled to the first evaporator coil 120A, and the second valve 118B may be fluidly coupled to the second evaporator coil 120B. In certain embodiments, the first valve 118A and the second valve 118B may be disposed in parallel to each other and may be configured to remove the pressure of the refrigerant as the refrigerant flows through each of them towards the first evaporator coil 120A and the second evaporator coil 120B, respectively. Without limitations, any suitable valve, such as a solenoid valve, a thermostatic expansion valve, an electronic expansion valve, or the like, may be utilized in the HVAC system 100 as the first valve 118A and/or the second valve 118B.

As illustrated, the HVAC system 100 may further comprise a pressure regulator 210 disposed at a suction side of either the first evaporator coil 120A or the second evaporator coil 120B. While the pressure regulator 210 may be illustrated as being disposed at a suction side of the first evaporator coil 120A, the present disclosure is not limited to the pressure regulator 210 being disposed at that location. The pressure regulator 210 may be configured to control the suction pressure in whichever coil is downstream (for example, first evaporator coil 120A). In these embodiments, the first evaporator coil 120A may operate with a colder refrigerant and may need to be defrosted more often than the second evaporator coil 120B, thereby providing the second evaporator coil 120B to build-up less ice and frost and to operate in a cooling cycle for a longer duration.

Figure 4:
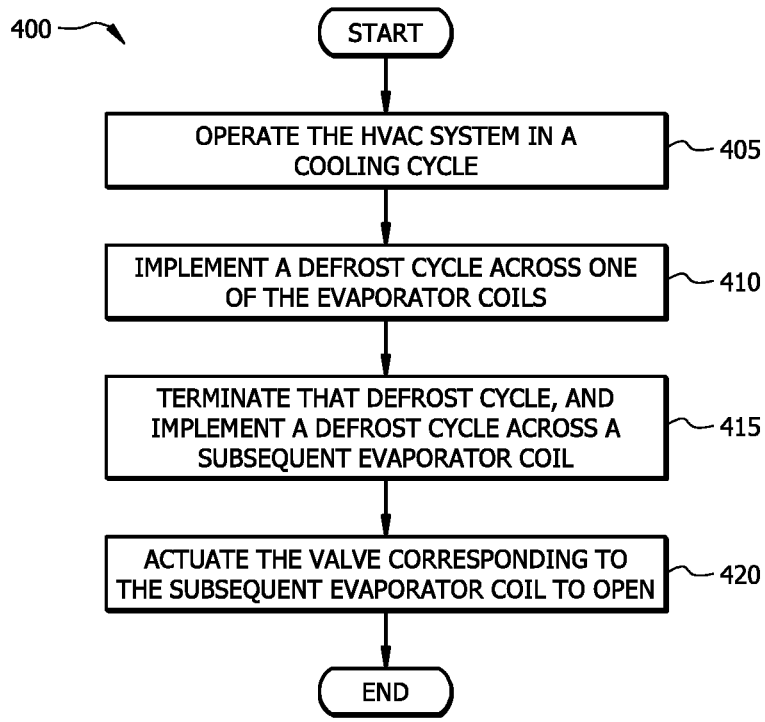
FIG. 4 illustrates an example method of operating the HVAC system of FIG. 3 for staggered defrost cycles.

FIG. 4 is a flowchart of an example method 400 of operating the HVAC system 100 of FIGS. 2-3. The method 400 generally facilitates the operation of a cooling cycle and a defrost cycle within the HVAC system 100. At step 405, both the first valve 118A (referring to FIGS. 2-3) and the second valve 118B (referring to FIGS. 2-3) may be opened to allow refrigerant to flow through to the first evaporator coil 120A (referring to FIGS. 2-3) and the second evaporator coil 120B (referring to FIGS. 2-3), respectively, during a cooling cycle. In certain embodiments, the first valve 118A and/or the second valve 118B may be fully opened or partially opened to allow the refrigerant to flow through. As refrigerant flows through the first evaporator coil 120A and the second evaporator coil 120B, the blower 132 may be actuated to direct air to flow over an external surface of the first evaporator coil 120A and the second evaporator coil 120B within the unit cooler 119 (referring to FIGS. 2-3).

The refrigerant may cool metallic components of the first evaporator coil 120A and the second evaporator coil 120B as the refrigerant passes through the unit cooler 119. These components may become so cold that vapor in the air external to these components condenses and eventually freeze or frost onto these components. As the ice or frost accumulates on these metallic components, it may become more difficult for the refrigerant in these components to absorb heat from the air external to these components. In essence, the frost and ice act as a thermal barrier. As a result, the efficiency of the system decreases the more ice and frost that accumulates.

At step 410, a defrost cycle may be implemented across either the first evaporator coil 120A or the second evaporator coil 120B. For the following example, the defrost cycle will be described as first occurring over the first evaporator coil 120A. During step 410, the first valve 118A may be actuated to close, thereby preventing the flow of refrigerant into the first evaporator coil 120A. In embodiments, the second valve 118B may remain open or partially open and allow refrigerant to flow into and through the second evaporator coil 120B. In step 410, the blower 132 may continue to direct air to flow over an external surface of the first evaporator coil 120A and the second evaporator coil 120B within the unit cooler 119. As the air flows through the unit cooler 119, the ice and frost accumulated on the first evaporator coil 120A may thaw and/or melt off as the temperature of the air may be greater than that of the first evaporator coil 120A. Heat may be transferred from the air to the first evaporator coil 120A, thereby increasing the temperature of the ice and frost. In certain embodiments, there may additionally be heat transfer between the air and the refrigerant flowing through the second evaporator coil 120B, wherein the refrigerant may dispose of the absorbed heat to an external environment through the condensing unit 104 (referring to FIG. 1). As the second evaporator coil 120B may be operating in a cooling cycle, the indoor temperature may remain at or close to the temperature setpoint.

At step 415, the defrost cycle for the first evaporator coil 120A may be terminated, and a defrost cycle may be implemented across the second evaporator coil 120B. During step 415, the first valve 118A may be actuated to open, thereby allowing the flow of refrigerant into the first evaporator coil 120A. In embodiments, the second valve 118VB may be actuated to close and prevent refrigerant to flow into and through the second evaporator coil 120B. In step 415, the blower 132 may continue to direct air to flow over an external surface of the first evaporator coil 120A and the second evaporator coil 120B within the unit cooler 119.

As similarly described in step 410, as the air flows through the unit cooler 119, the ice and frost accumulated on the second evaporator coil 120B may thaw and/or melt off as the temperature of the air may be greater than that of the second evaporator coil 120B. Heat may be transferred from the air to the second evaporator coil 120B, thereby increasing the temperature of the ice and frost. In certain embodiments, there may be heat transfer between the air and the refrigerant flowing through the first evaporator coil 120A, wherein the refrigerant may dispose of the absorbed heat to an external environment through the condensing unit 104. As the first evaporator coil 120A may be operating in a cooling cycle, the indoor temperature may remain at or close to the temperature setpoint.

At step 420, the defrost cycle for the second evaporator coil 120B may be terminated, and a cooling cycle may be implemented across both the first evaporator coil 120A and the second evaporator coil 120B. During step 420, the second valve 118Bmay be actuated to open, thereby allowing the flow of refrigerant into the second evaporator coil 120B, wherein the first valve 118A may remain open or partially open and allow refrigerant to flow into and through the first evaporator coil 120A. In certain embodiments, the HVAC system 100 may operate in the cooling cycle until the cooling cycle is manually terminated through user input into the thermostat 138 (referring to FIG. 1), until a subsequent defrost cycle is scheduled, and any combinations thereof.

Throughout the method 400, the first sensor 136A (referring to FIGS. 2-3) and the second sensor 136B (referring to FIGS. 2-3) may measure a temperature and/or pressure at the discharge side of each of the first evaporator coil 120A and the second evaporator coil 120B, respectively. In embodiments, the first sensor 136A and the second sensor 136B may transmit measurements to the controller 144 (referring to FIGS. 2-3). The controller 144 may receive the temperature and/or pressure measurements from the first sensor 136A and the second sensor 136B. Depending on the received measurements, the temperature setpoint, and/or other suitable factors, the controller 144 may transmit instructions to the first valve 118A and/or the second valve 118B in order to actuate the first valve 118A and/or the second valve 118B to open or close. In certain embodiments, the first valve 118A and/or the second valve 118B may be actuated to open or close based, at least in part, on the measurements provided to the controller 144 by the first sensor 136A and the second sensor 136B. In certain embodiments, the controller 144 may instruct for the HVAC system 100 to start and/or stop a defrost cycle based on a period of time that the HVAC system 100 has operated with the staggered cycle configuration. The present disclosure herein defines "staggered cycle" as operating a single coil in a defrost cycle while the other coils are operating in a cooling cycle, then switching the coil in the defrost cycle to operate in the cooling cycle and the coil in the cooling cycle to operate in the defrost cycle. In embodiments, the controller 144 may actuate the HVAC system 100 to perform staggered defrost cycles one or more times a day.

Modifications, additions, or omissions may be made to method 400 depicted in FIG. 4. Method 400 may include more, fewer, or other steps. For example, steps may be performed in parallel or in any suitable order. While at times discussed as controller 144, HVAC system 100, or components thereof performing steps, any suitable HVAC system or components of the HVAC system 100 may perform one or more steps of the method 400.

Controller

Figure 5:
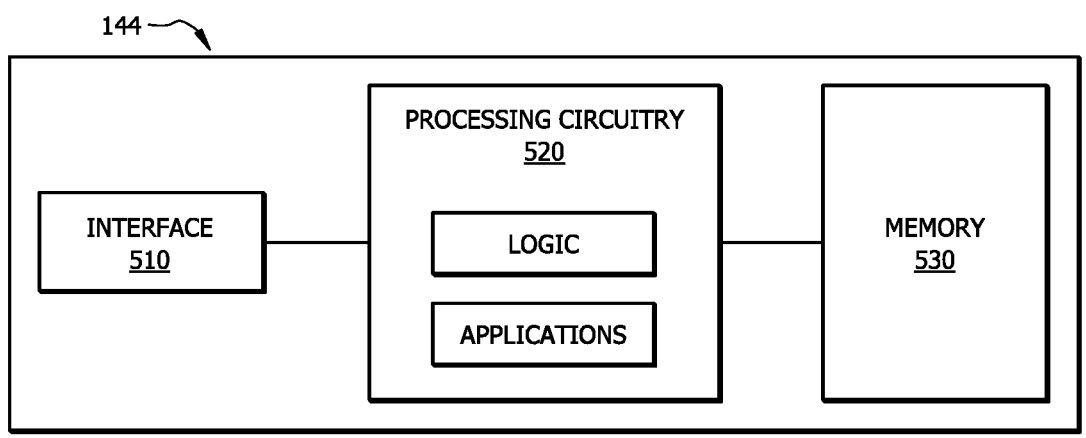
FIG. 5 illustrates one embodiment of a controller of the HVAC system illustrated in FIG. 1.

FIG. 5 shows an example controller 144 that may be used by the systems and methods described herein. For example, the controller 144 of the HVAC system 100 of FIGS. 1-3 may include one or more interface(s) 510, processing circuitry 520, memory(ies) 530, and/or other suitable element(s). Interface 510 receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. §112(f) as it exists on the date of filing hereof unless the words "means for" or "step for" are explicitly used in the particular claim.

What is claimed is:

1. A heating, ventilation, and air conditioning (HVAC) system, comprising:
    a refrigerant conduit subsystem;
    a condensing unit configured to discharge heat from a refrigerant received from the refrigerant conduit subsystem;
    a unit cooler comprising a first evaporator coil, a second evaporator coil, and a blower;
    a first sensor disposed at a discharge side of the first evaporator coil, the first sensor configured to measure a temperature of the refrigerant discharged from the first evaporator coil;
    a second sensor disposed at a discharge side of the second evaporator coil, the second sensor configured to measure a temperature of the refrigerant discharged from the second evaporator coil;
    a pressure regulator disposed at a suction side of the first evaporator coil, wherein the pressure regulator is configured to control the suction pressure of the first evaporator coil such that the refrigerant in the first evaporator coil operates at a cooler temperature relative to the refrigerant in the second evaporator coil;
    a first valve corresponding to the first evaporator coil and configured to provide a flow of the refrigerant into the first evaporator coil, wherein the first valve is disposed upstream of the unit cooler;
    a second valve corresponding to the second evaporator coil and configured to provide the flow of the refrigerant into the second evaporator coil, wherein the second valve is disposed upstream of the unit cooler; and
    a controller operable to:
        receive the temperature of the refrigerant discharged from the first evaporator coil;
        initiate a first defrost cycle for the first evaporator coil in response to the received temperature of the refrigerant discharged from the first evaporator coil, wherein initiating the first defrost cycle includes-by transmitting instructions to close the first valve to prevent the flow of refrigerant into the first evaporator coil;
        transmit instructions to open the first valve when the first defrost cycle for the first evaporator coil has terminated;
        receive the temperature of the refrigerant discharged from the second evaporator coil;
        initiate a second defrost cycle for the second evaporator coil in response to the received temperature of the refrigerant discharged from the first evaporator coil, wherein initiating the second defrost cycle includes transmitting instructions to close the second valve to prevent the flow of refrigerant into the second evaporator coil;
        transmit instructions to open the second valve when the second defrost cycle for the second evaporator coil has terminated; and
        actuate the blower to direct air to flow over both the first evaporator coil and the second evaporator coil during the first defrost cycle and the second defrost cycle.

2. The HVAC system of claim 1, wherein the first valve and the second valve are each selected from the group consisting of a solenoid valve, a thermostatic expansion valve, and an electronic expansion valve.

3. The HVAC system of claim 1, further comprising a thermostat communicatively coupled to the controller, wherein the thermostat is configured to allow a user to input a temperature setpoint.

4. The HVAC system of claim 3, wherein the controller is further operable to receive the temperature setpoint from the thermostat.

5. The HVAC system of claim 1, wherein the first valve is disposed in parallel to the second valve, wherein the first valve is fluidly coupled to the first evaporator coil, and wherein the second valve is fluidly coupled to the second evaporator coil.

6. The HVAC system of claim 1, wherein the condensing unit comprises a compressor, a condenser, and a fan.

7. The HVAC system of claim 1, wherein the first sensor is configured to measure the temperature and pressure of the refrigerant at the discharge side of the first evaporator coil, wherein the second sensor is configured to measure the temperature and pressure of the refrigerant at the discharge side of the second evaporator coil, wherein both the first sensor and the second sensor are configured to transmit the measurements to the controller, and wherein the controller is further operable to actuate the first valve and the second valve based, at least in part, on the measurements transmitted by the first sensor and the second sensor.

* * * * *